United States Patent [19]

Kunderman

[11] 4,012,085
[45] Mar. 15, 1977

[54] SHAFT SUPPORT MEANS

[75] Inventor: Fred Kurt Kunderman, Olean, N.Y.

[73] Assignee: Dresser Industries, Inc., Dallas, Tex.

[22] Filed: Oct. 16, 1975

[21] Appl. No.: 623,203

[52] U.S. Cl. ............................... 308/26; 308/36 R; 308/62; 248/9

[51] Int. Cl.² ................. F16C 27/00; F16C 35/00

[58] Field of Search ............. 308/36.3, 36, 73, 72, 308/26, 62; 248/6, 9, 15, 18, 20, 54, 204, 358

[56] References Cited

UNITED STATES PATENTS

| 3,436,835 | 4/1969 | Richter | 308/26 |
|---|---|---|---|
| 3,747,878 | 7/1973 | Leingang | 308/26 |
| 3,756,673 | 9/1973 | Staub | 308/36.3 |

Primary Examiner—Joseph F. Peters, Jr.
Assistant Examiner—Richard A. Bertsch
Attorney, Agent, or Firm—Roy L. Van Winkle; John N. Hazelwood

[57] ABSTRACT

The improved shaft support means described herein provides a means for resiliently supporting and damping the vibrations occurring in a shaft in a turbo-machine or the like. The bearings supporting the shaft are located in bores formed in the housing of the turbo-machine. The shaft is oriented in an horizontal direction and the housing is split along a horizontal plane extending through the bore. The upper portion of the bore is provided with a groove that is formed on a centerline coincident with the centerline of the bore. The lower half of the bore is provided with a groove that is formed from a centerline located above the centerline of the bore so that the lower portion of the groove is of less depth than the groove of the upper portion of the bore. An O-ring or the like is disposed in the groove encircling the bearing. As a result, a greater force is exerted by the O-ring in the lower portion of the bore than in the upper portion of the bore so that compensation is made for the weight of the rotor and shaft assembly in the design of the turbo-machine. Thus, compensation is made in the design of the turbo-machine for the weight of the shaft and rotor while at the same time providing resilient damping means to accommodate the vibrations of the shaft and rotor during operation.

5 Claims, 5 Drawing Figures

SHAFT SUPPORT MEANS

BACKGROUND OF THE INVENTION

This invention relates generally to an improved bearing means for resiliently supporting turbo-machine shaft and rotor assemblies in turbo-machinery. More particularly, but not by way of limitation, this invention relates to an improved shaft support means that compensates for the initial weight of the shaft and rotor assembly while providing damping therefor during operation of the turbo-machine.

In the past, many attempts have been made to provide some means for damping the isolation of shafts in turbo-machinery. One such an attempt is illustrated and described in U.S. Pat. No. 3,756,673 issued Sept. 4, 1973 to Rene Strub. The shaft support means described therein includes a plurality of metallic and generally circular leaf springs disposed between the bearing and the housing. The springs are formed so that they are not precisely circular and thus exert some biasing force between the housing and the bearing provided for the damping of the turbo-machine during operation. However, and as described therein, there is no means provided to compensate for the weight of the shaft and rotor assembly.

Accordingly, it is the object of this invention to provide improved shaft support means that not only provides for the damping of the shaft and rotor assembly during operation of the turbo-machine, but that also provides compensation for the weight of the shaft and rotor assembly.

SUMMARY OF THE INVENTION

This invention provides an improved shaft support assembly for turbo-machines or the like having a generally horizontally oriented rotor and shaft assembly journaled in a housing. The support assembly comprises a bore in the housing and a groove in the housing in the bore with the groove being of less depth adjacent to the lower portion of the bore. A bearing located in the bore encircling the shaft is encircled by a toroidal member of resilient material that is located in the groove in resilient supporting engagement with the bearing whereby the lesser depth of the groove causes the toroidal member to exert a greater upwardly directed force on the bearing to compensate for the weight of the rotor and shaft assembly.

DETAILED DESCRIPTION OF THE PREFERRED EMBODIMENT

Figure 1:
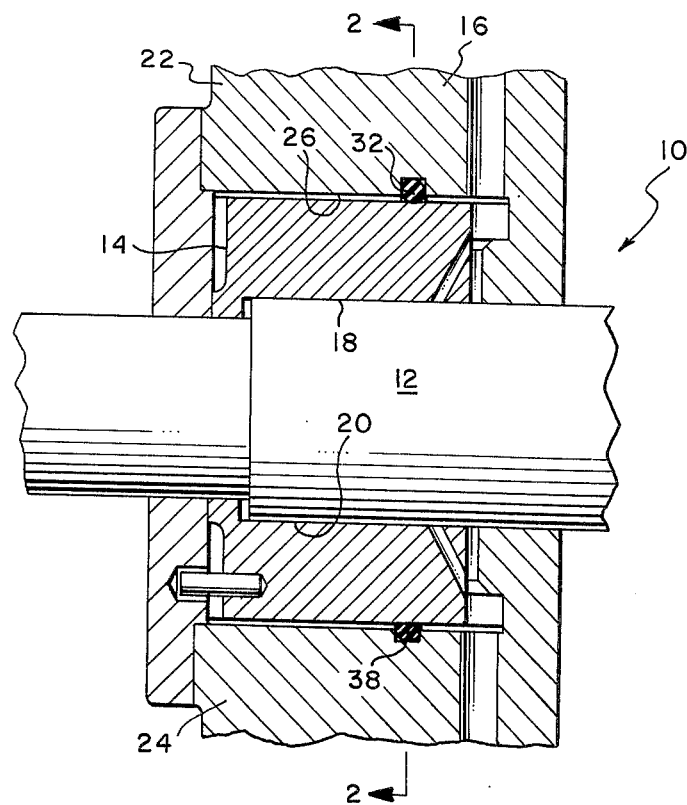
FIG. 1 is a cross-sectional view of one embodiment of shaft support means that is constructed in accordance with the invention.

Referring to the drawing and to FIG. 1 in particular, shown therein and generally designated by the reference character 10 is a portion of a turbo-machine including bearing support means constructed in accordance with the invention. The turbo-machine 10 includes a shaft and rotor assembly 12 journaled in a bearing 14 that is located in a housing 16. Although not shown, the bearing 14 has a bore 18 that is slightly larger than the outside diameter 20 of the shaft 12 so that an oil film is formed therebetween. The oil film functions not only to seal between the shaft 12 and bearing 14, but also provides for lubrication therebetween. Oil film seals and the housing/bearing construction therefor are well known in the art.

Figure 2:
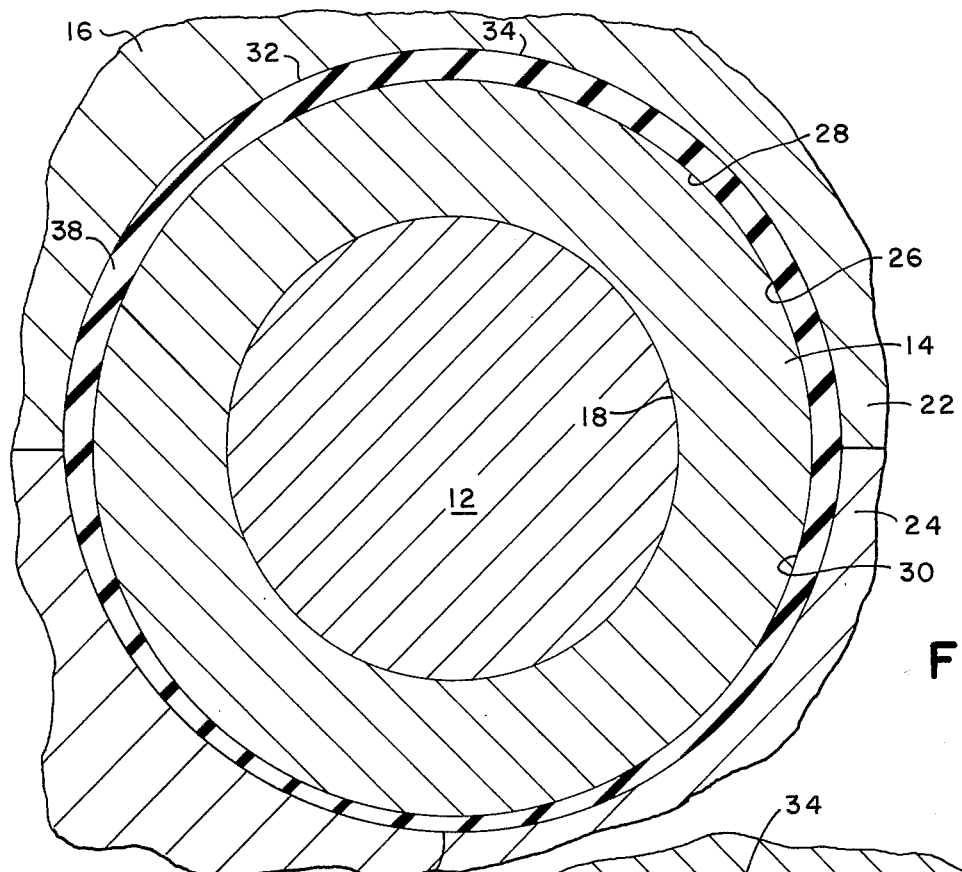
FIG. 2 is a cross-sectional view taken substantially along the line 2—2 of FIG. 1.

The housing 16 is illustrated in FIG. 2 as being constructed from an upper portion 22 and a lower portion 24 which are joined generally long the centerline of a bore 26 extending through the housing 16. The bore 26 is formed in the housing 16 with the upper and lower portions 22 and 24 joined so that the bore 26 has identical though inverted, upper and lower portions 28 and 30.

The housing 16 is further provided with a groove 32 that generally encircles the bore 16. However, it will be noted that the groove 32 has an upper portion 34 in the upper portion 22 of the housing 16 that is deeper than a lower portion 36 of the groove 32 that is formed in the lower portion 24 of the housing 16. The method of attaining the different depths of the groove portions 34 and 36 will be discussed in more detail in connection with the description of FIGS. 4 and 5.

The lower portion 36 of the groove 32 is formed with less depth so that a resilient toroidal member 38, which is preferably an O-ring, placed in the groove 32 is more highly stressed in the lower portion 24 of the housing 16 and, thus, exerts a greater upwardly directed force on the bearing 14 to aid in supporting the weight of the shaft and rotor assembly 12. Aside from the consideration of the size and resiliency of the member 38, the depth of the groove 32 will be determined by the weight of the shaft assembly 12. The ideal design will cause sufficient force to be exerted by the member 38 to align the bearing 14 and shaft 12 on the centerline of the bore 26 in the housing 16.

It will of course be understood that the member 38 provides a resilient force in all directions on the exterior of the bearing 14. Thus, the member 38 provides for resiliently supporting and damping the vibratory movements of the shaft assembly 12. Since the bearing 14 can move to some extent, the bearing 14 remains substantially centered on the shaft assembly 12. As a result of this centering action, the oil film is maintained during operation of the turbo-machine 10 preventing bearing and seal failure.

DESCRIPTION OF THE EMBODIMENT OF FIG. 3

Figure 3:
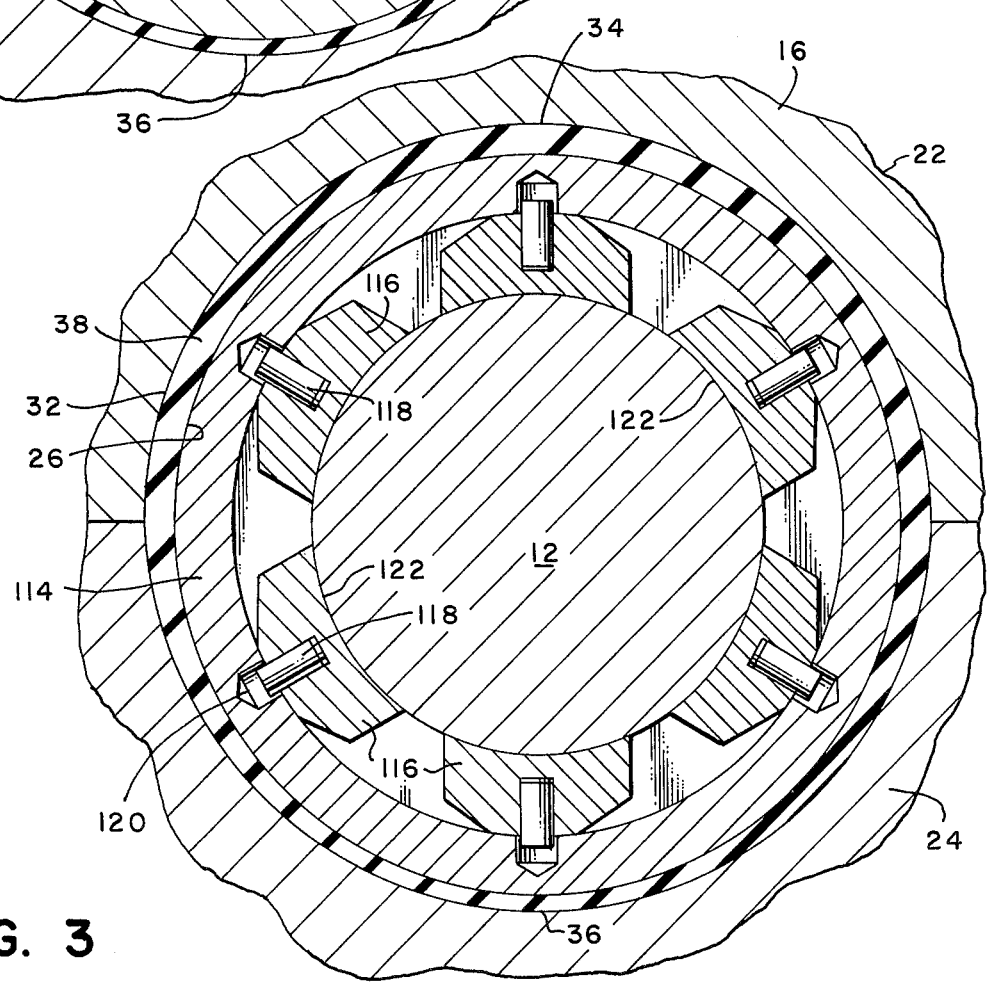
FIG. 3 is a cross-sectional view similar to FIG. 2, but illustrating another embodiment of bearing used in a support means that is also constructed in accordance with the invention.

FIG. 3 is a cross-sectional view similar to FIG. 2, but illustrating the support system of the invention in combination with a rocker shoe bearing 114. Many of the components in FIG. 3 are identical to those shown in FIGS. 1 and 2 and, on such identical parts, the same reference characters will be used.

Referring to FIG. 3, it can be seen that the rocker shoe bearing 114 is disposed in the bore 26 of the housing 16. The toroidal member 38 is positioned in the groove 32 in engagement with the exterior of the bearing 114.

As described in connection with FIGS. 1 and 2, the groove 32 has a lower portion 36 of less depth than the upper portion 34 so that the member 38 exerts an upwardly directed force on the bearing 114 counteracting the weight of the shaft and rotor assembly 12. Also, and as previously mentioned, the member 38 exerts a resilient-damping force in all directions on the bearing 114.

The bearing 114 is held substantially centered on the shaft assembly 12 by a plurality of rocker shoes 116 that are circumferentially spaced about the interior of the bearing 114. Each rocker shoe 116 is pivotally mounted in the bearing 114 by a pin 118 that extends into a mating hole 120 in the bearing 114.

It will be noted that each shoe 116 has an arcuate surface 122 disposed adjacent to the shaft assembly 12. Although not shown, an oil film will be present in a small space that exists between the arcuate surfaces 122 and the exterior of the shaft assembly 12. As previously noted, the member 38 permits the bearing 114 to move slightly so that it remains centered on the shaft assembly 12 despite vibrational movement of the shaft assembly 12 relative to the housing 16.

Figure 4:
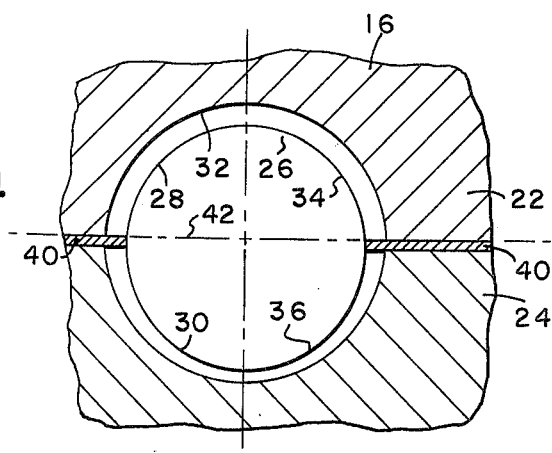
FIG. 4 is a view that illustrates the construction of the groove utilized in the invention.
Figure 5:
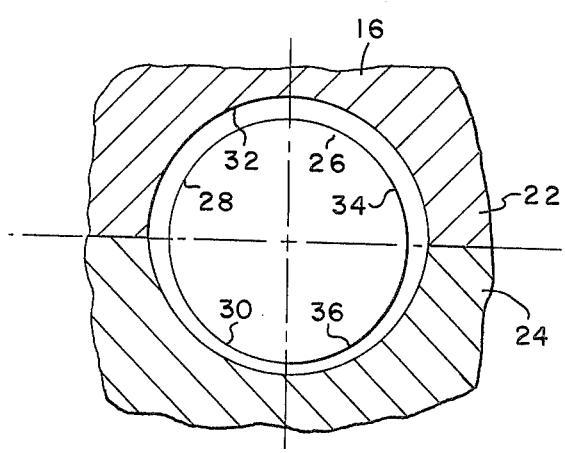
FIG. 5 is a view similar to FIG. 4, but showing the groove configuration when the housing is assembled.

METHOD OF FIGS. 4 and 5

FIGS. 4 and 5 illustrate a method of forming the groove 32 in the housing 16. After the bore 26 is formed in the housing 16 with the upper and lower portions 22 and 24 of the housing 16 joined, the portions are separated and a shim 40 is positioned therebetween. The portions 22 and 24 are then reconnected with the shim 40 located as above-mentioned. The upper side of the shim 40 is aligned with centerline 42 of the bore 26. Stated in another way, the lower portion 24 of the housing 16 is effectively lowered by the thickness of the shim 40.

The groove 32 is then machined by a tool that is located on the centerline 42 of the bore 26. With the lower portion 24 displaced by the thickness of the shim 40, the upper portion 34 of groove 32 is concentric with the upper portion 28 of the bore 26. The lower portion 36 of the groove 32 is not concentric with the lower portion 30 of the bore 26, but is displaced therefrom by the thickness of the shim 40. Thus, the groove 32 is somewhat "eccentric" to the bore 26 with the lesser depth located in the lower portion 24 of the housing 16.

After the groove 32 is formed, the shim 40 is removed and the housing portions 22 and 24 reassembled as shown in FIG. 5. The "eccentric" configuration of the groove 32 is clearly illustrated in that figure.

From the foregoing detailed description, it can be seen that a bearing support system constructed in accordance with the invention will compensate for the weight of the shaft and rotor assembly while providing the resilient support and damping necessary to the operation of turbo-machines.

The embodiments described herein are presented by way of example only and many changes and modifications can be made thereto without departing from the spirit and scope of the invention.

The embodiments of an invention in which an exclusive property or privilege is claimed are defined as follows:

1. Improved shaft support means for turbo-machines or the like having a generally horizontally oriented rotor and shaft assembly journaled in a housing, said support means comprising:
    a bore in said housing;
    a groove in said housing in said bore, said groove being of less depth adjacent the lower portion of said bore;
    bearing means located in said bore and encircling said shafts; and,
    a toroidal member of resilient material encircling said bearing means and located in said groove in resilient supporting engagement with said bearing means whereby the lesser depth of said groove causes said member to exert a greater upward force on said bearing to compensate for the weight of said rotor and shaft assembly.

2. The improved shaft support means of claim 1 wherein said bearing means includes an annular member forming a film seal with said shaft.

3. The improved shaft support means of claim 1 wherein said bearing means includes:
    an annular outer member; and,
    a plurality of circumferentially-spaced, rockable bearing shoes supportingly engaging the shaft.

4. The improved shaft support means of claim 1 wherein said toroidal member comprises an O-ring.

5. The improved shaft support means of claim 1 wherein:
    said housing is in two parts that are joined along a horizontal plane extending through the bore; and
    said groove consists of upper and lower portions with the upper portion of said groove being generated from a first centerline, the lower portion of said groove being generated from a second centerline located relatively above said first centerline, and both said groove portions having the same diameter.

* * * * *